United States Patent
Itagaki et al.

(10) Patent No.: US 9,650,035 B2
(45) Date of Patent: May 16, 2017

(54) CONTROL APPARATUS FOR HYBRID VEHICLE

(71) Applicant: TOYOTA JIDOSHA KABUSHIKI KAISHA, Toyota-shi, Aichi (JP)

(72) Inventors: Kenji Itagaki, Suntou-gun (JP); Naofumi Magarida, Suntou-gun (JP); Youmei Hakumura, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/611,356

(22) Filed: Feb. 2, 2015

(65) Prior Publication Data
US 2015/0217760 A1 Aug. 6, 2015

(30) Foreign Application Priority Data

Feb. 5, 2014 (JP) ................. 2014-020121

(51) Int. Cl.
| | | |
|---|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/30 | (2016.01) |
| F16H 61/02 | (2006.01) |

(Continued)

(52) U.S. Cl.
CPC .............. *B60W 20/30* (2013.01); *F16H 3/727* (2013.01); *F16H 61/0213* (2013.01); *F16H 61/16* (2013.01); *F16H 2059/663* (2013.01); *F16H 2061/163* (2013.01); *Y10S 903/945* (2013.01)

(58) Field of Classification Search
CPC .... B60W 20/30; F16H 61/16; F16H 61/0213; F16H 3/727; F16H 2059/663; F16H 2061/163; Y10S 903/945
USPC ................. 701/22; 180/65.275; 903/945
See application file for complete search history.

(56) References Cited

U.S. PATENT DOCUMENTS 5,941,793 A * 8/1999 Ito ................. F16H 61/0213
477/120
6,397,140 B2 * 5/2002 Minowa ............. B60K 31/0008
701/111

(Continued)

FOREIGN PATENT DOCUMENTS

| JP | 2005-299844 A | 10/2005 |
| JP | 2009-190572 A | 8/2009 |

*Primary Examiner* — Jaime Figueroa
(74) *Attorney, Agent, or Firm* — Andrews Kurth Kenyon LLP

(57) ABSTRACT

A control apparatus is applied to a hybrid vehicle. The hybrid vehicle includes an internal combustion engine and a second MG as driving sources, and a power split mechanism which is capable of changing and transmitting to an output portion transmitting torque to drive wheel, a rotating speed of the internal combustion engine. And, the hybrid vehicle is capable of switching a gear ratio mode of the power split mechanism between a variable gear ratio mode and a fixed gear ratio mode.

The control apparatus determines whether or not a switching of the gear ratio modes is prohibited based on a vehicle speed and a gradient of a road. And, when it is determined that the switching is prohibited, the control apparatus maintains the gear ratio mode in the variable gear ratio mode or the fixed gear ratio mode.

4 Claims, 10 Drawing Sheets

(51) Int. Cl.
  *F16H 61/16* (2006.01)
  *F16H 3/72* (2006.01)
  *F16H 59/66* (2006.01)

(56) References Cited

U.S. PATENT DOCUMENTS

| | | | | |
|---|---|---|---|---|
| 6,503,170 B1* | 1/2003 | Tabata | ................ | F16H 59/0204 475/254 |
| 7,219,757 B2* | 5/2007 | Tomita | .................... | B60K 6/26 180/65.275 |
| 2001/0044686 A1* | 11/2001 | Taniguchi | ......... | F16H 61/66259 701/51 |
| 2004/0256165 A1* | 12/2004 | Tomita | .................... | B60K 6/26 180/65.235 |
| 2005/0064974 A1* | 3/2005 | Bezian | ................... | B60K 6/365 475/5 |
| 2005/0245351 A1* | 11/2005 | Yamada | ................ | B60W 10/06 477/110 |
| 2008/0119323 A1* | 5/2008 | Kitaori | .................... | F16H 61/20 477/97 |
| 2008/0314658 A1* | 12/2008 | Atarashi | ................ | B60K 6/445 180/65.25 |
| 2012/0028757 A1* | 2/2012 | Kimura | .................. | B60K 6/365 477/5 |
| 2012/0095635 A1* | 4/2012 | Kanno | ................... | B60K 6/445 701/22 |
| 2014/0031168 A1* | 1/2014 | Yang | ...................... | B60K 6/547 477/3 |
| 2014/0066251 A1* | 3/2014 | Kawamoto | ........... | B60W 20/30 477/4 |
| 2014/0114553 A1* | 4/2014 | Abdul-Rasool | ....... | B60W 10/02 701/110 |

* cited by examiner

CONTROL APPARATUS FOR HYBRID VEHICLE

CROSS-REFERENCE TO RELATED APPLICATION

The present application claims priority to Japanese Patent Application No. 2014-020121 filed on Feb. 5, 2014, which is incorporated herein by reference in its entirety.

TECHNICAL FIELD

The present invention relates to a control apparatus applied to a hybrid vehicle including: an output portion for transmitting torque to drive wheels; and a power transmission mechanism which is capable of changing and transmitting rotating speed of an internal combustion engine, and being capable of switching gear ratio modes of the power transmission mechanism between a variable gear ratio mode and a fixed gear ratio mode.

BACKGROUND ART

There is known a hybrid vehicle that includes a power transmission mechanism which is connected with an internal combustion engine, a motor generator, and an output member, and is capable of changing and transmitting to the output member, rotating speed of the internal combustion engine. Furthermore, in such a hybrid vehicle, there is known a vehicle which is capable of switching modes of the power transmission mechanism between a variable gear ratio mode where gear ratios are changeable continuously and a fixed gear ratio mode where gear ratio is fixed in an overdrive state where rotating speed of the internal combustion engine is lower than rotating speed of the output member. And, there is known a control apparatus including a map which shows correlation between an operating point of the vehicle which is specified by vehicle speed and target driving power, and an operating region where the mode should be switched to the variable gear ratio mode and an operating region where the mode should be switched to the fixed gear ratio mode, and switching the mode of the power transmission mechanism based on this map and the present operating point of the vehicle (see Patent Literature 1). In addition, there is Patent Literature 2 as prior art reference in relation to the present invention.

CITATION LIST

Patent Literature

Patent Literature 1: JP 2009-190572 A
Patent Literature 2: JP 2005-299844 A

SUMMARY OF INVENTION

Technical Problem

As in the apparatus of Patent Literature 1, in a case that the modes of the power transmission mechanism are switched based on the map, when the operating point of the vehicle in a steady traveling is around a boundary between the operating region of the variable gear ratio mode and the operating region of the fixed gear ratio mode, there is a possibility that the operating point of the vehicle reciprocates between these two operating regions by a slight accelerator operation. In this case, there is possibility that the modes of the power transmission mechanism are switched frequently. As well known, a travel load, that is, a required power to the vehicle when the vehicle is made to travel in a steady traveling changes according to a gradient of a road where the vehicle is traveling. In the apparatus of Patent Literature 1, no regard is given to a control of the mode switching of the power transmission mechanism according to the gradient of the road.

In view of the foregoing, one object of the present invention is to provide a control apparatus for a hybrid vehicle capable of suppressing an occurrence of frequent switching of the modes of the power transmission mechanism as compared with a conventional technique.

Solution to Problem

A control apparatus of the present invention is applied to a hybrid vehicle, the hybrid vehicle including: an internal combustion engine and an electric motor as driving sources; a power transmission mechanism which is capable of changing and transmitting to an output portion transmitting torque to a drive wheel, a rotating speed of the internal combustion engine, the power transmission mechanism being built so as to switch a gear ratio mode of the power transmission mechanism between a variable gear ratio mode and a fixed gear ratio mode; and a computer, the control apparatus comprising a control device that the computer functioning as by implementing a computer program, and the control device being configured to control the power transmission mechanism to switch the gear ratio modes based on a required power to the vehicle and a vehicle speed, wherein the control apparatus further comprises a control prohibition device that the computer further functions as by implementing the computer program, and the control prohibition device being configured to determine whether or not a switching of the gear ratio modes performed by the control device is prohibited based on a gradient of a road where the vehicle travels and at least anyone of the required power and the vehicle speed, and to maintain the gear ratio mode in the variable gear ratio mode or the fixed gear ratio mode when it is determined that the switching of the gear ratio modes is prohibited.

In the control apparatus of the present invention, since whether or not the switching of the gear ratio modes is prohibited is determined based on the gradient of the road and at least any one of the required power to the vehicle and the vehicle speed, the switching of the gear ratio modes is controlled in consideration of the gradient of the road. Thereby, it is possible to suppress, as compared with a conventional technique, an occurrence of frequent switching of the gear ratio modes performed by the power transmission mechanism, the frequent switching occurring because of an influence of the gradient of the road.

In one embodiment of the control apparatus of the present invention, the control apparatus may further comprises a storage device which stores a map where a control permission region where the switching of the gear ratio modes is permitted, a lock maintaining region where the gear ratio mode is maintained in the fixed gear ratio mode, and a lock prohibition region where the gear ratio mode is maintained in the variable gear ratio mode are set so as not to overlap with each other, in a region which is specified by the vehicle speed and the gradient, wherein the control prohibition device may be configured to determine whether or not the switching of the gear ratio modes is prohibited based on the map, the lock prohibition region may be set based on a maximum value and a minimum value of each of predetermined vehicle speed ranges, the predetermined vehicle speed range lying around an operating point where an upper limit line of the required power and an operating line are intersected each other, the upper limit line being one of boundary lines between a lock region where the gear ratio mode is switched to the fixed gear ratio mode and a not-lock region where the gear ratio mode is switched to the variable gear ratio mode, the lock region and the not-lock region being specified by the vehicle speed and the required power, the operating line being obtained in a case that the vehicle travels in a steady traveling state on a road where the gradient is a predetermined magnitude and being specified by the vehicle speed and the required power, and the lock maintaining region may be set based on a maximum value and a minimum value of each of predetermined vehicle speed ranges, the predetermined vehicle speed range lying around an operating point where a lower limit line of the required power which is one of the boundary lines and the operating line are intersected with each other. By determining whether or not the switching of the gear ratio modes is permitted by using the map where the lock maintaining region and the lock prohibition region are set in this manner, it is possible to perform this determination easily. Furthermore, by setting the lock maintaining region and the lock prohibition region in this manner, it is possible to increase a rate that the vehicle is traveled in a good fuel efficiency region.

In one embodiment of the control apparatus of the present invention, the control apparatus may further comprises a storage device which stores a map where a control permission region where the switching of the gear ratio modes is permitted, a lock maintaining region where the gear ratio mode is maintained in the fixed gear ratio mode, and a lock prohibition region where the gear ratio mode is maintained in the variable gear ratio mode are set so as not to overlap with each other, in a region which is specified by the vehicle speed and the gradient, wherein the control prohibition device may be configured to determine whether or not the switching of the gear ratio modes is prohibited based on the map, the lock prohibition region may be set so as to include a region where the vehicle speed and the gradient are greater than the vehicle speed and the gradient of the control permission region, and the lock maintaining region may be set so as to include a region where the vehicle speed and the gradient are smaller than the vehicle speed and the gradient of the control permission region respectively. By setting the lock maintaining region and the lock prohibition region in this manner, it is possible to decrease a frequency that the switching of the gear ratio modes occurs.

In one embodiment of the control apparatus of the present invention, the control apparatus may further comprises a storage device which stores a map where a control permission region where the switching of the gear ratio modes is permitted, a lock maintaining region where the gear ratio mode is maintained in the fixed gear ratio mode, and a lock prohibition region where the gear ratio mode is maintained in the variable gear ratio mode are set so as not to overlap with each other, in a region which is specified by the required power and the gradient, wherein the control prohibition device may be configured to determine whether or not the switching of the gear ratio modes is prohibited based on the map, the lock prohibition region may be set based on a maximum value and a minimum value of each of predetermined required power ranges, the predetermined required power range lying around an operating point where an upper limit line of the required power and an operating line are intersected each other, the upper limit line being one of boundary lines between a lock region where the gear ratio mode is switched to the fixed gear ratio mode and a not-lock region where the gear ratio mode is switched to the variable gear ratio mode, the lock region and the not-lock region being specified by the vehicle speed and the required power, the operating line being obtained in a case that the vehicle travels on a road where the gradient is a predetermined magnitude in a steady traveling state and being specified by the vehicle speed and the required power, and the lock maintaining region may be set based on a maximum value and a minimum value of each of predetermined required power ranges, the predetermined required power range lying around an operating point where a lower limit line of the required power which is one of the boundary lines and the operating line are intersected with each other. By setting the lock maintaining region and the lock prohibition region in this manner, it is possible to increase a rate that the vehicle is traveled in a good fuel efficiency region.

In one embodiment of the control apparatus of the present invention, the control apparatus may further comprises a storage device which stores a map where a control permission region where the switching of the gear ratio modes is permitted, a lock maintaining region where the gear ratio mode is maintained in the fixed gear ratio mode, and a lock prohibition region where the gear ratio mode is maintained in the variable gear ratio mode are set so as not to overlap with each other, in a region which is specified by the required power and the gradient, wherein the control prohibition device may be configured to determine whether or not the switching of the gear ratio modes is prohibited based on the map, the lock prohibition region may be set so as to include a region where the required power is greater than the required power of the control permission region, and the lock maintaining region may be set so as to include a region where the required power is smaller than the required power of the control permission region. By setting the lock maintaining region and the lock prohibition region in this manner, it is possible to decrease a frequency that the switching of the gear ratio modes occurs.

DESCRIPTION OF EMBODIMENTS

Figure 1:
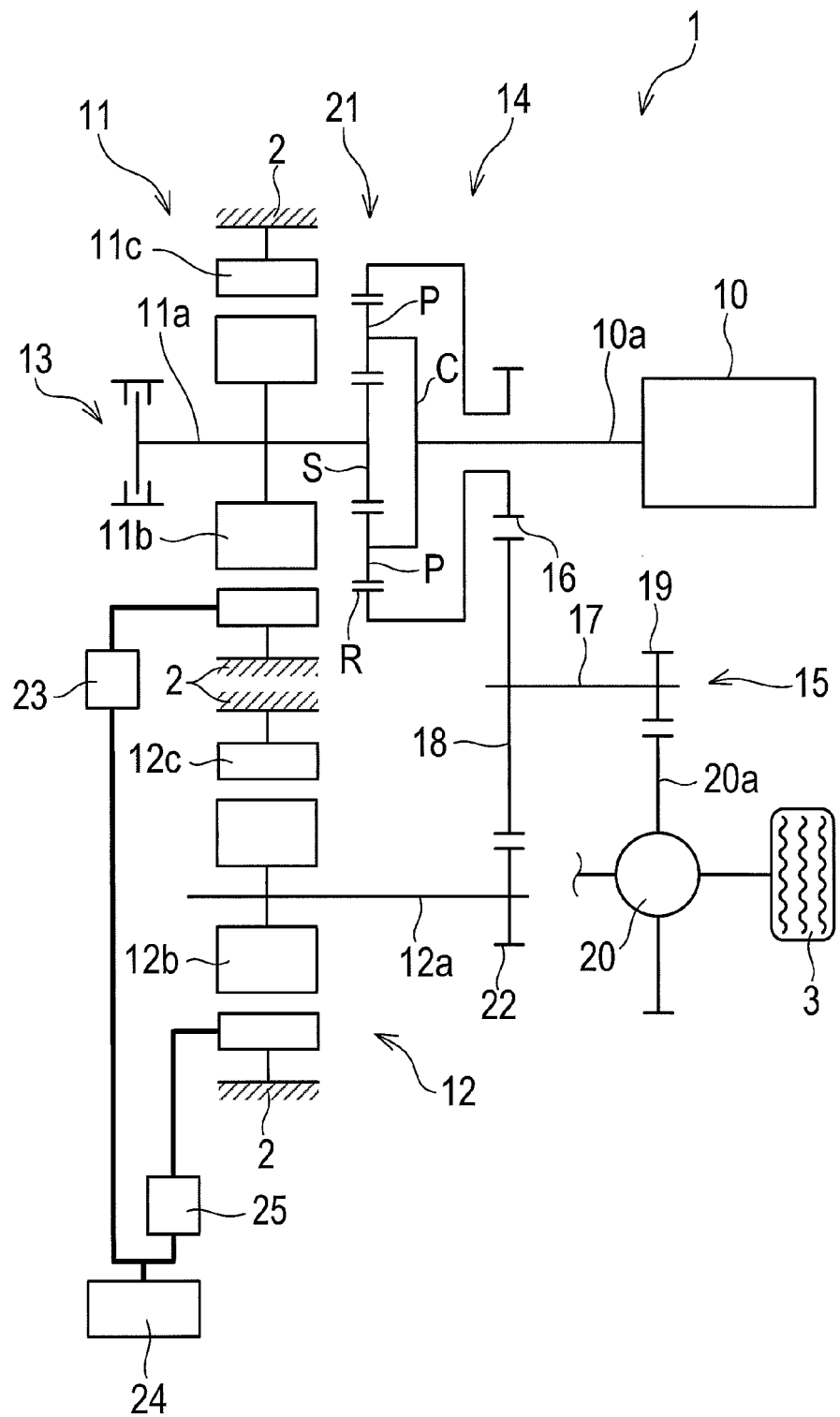
FIG. 1 is a schematic diagram showing a vehicle where a control apparatus according to one embodiment of the present invention is incorporated.

FIG. 1 schematically shows a vehicle where a control apparatus according to one embodiment of the present invention is incorporated. The vehicle 1 is configured as a hybrid vehicle where plural power sources are mounted. The vehicle 1 includes an internal combustion engine (hereinafter, referred to as an engine) 10, a first motor generator (hereinafter, referred to as a first MG) 11, and a second motor generator (hereinafter, referred to as a second MG) 12.

The engine 10 is a well known spark ignition type internal combustion engine having plural cylinders. Each of the first MG 11 and the second MG 12 is a well known motor generator which is mounted on a hybrid vehicle to function as an electric motor and a generator. The first MG 11 includes a rotor 11b which rotates integrally with an output shaft 11a and a stator 11c which is arranged on an outer circumference of the rotor 11b coaxially and is fixed to a case 2. Similarly, the second MG 12 also includes a rotor 12b which rotates integrally with an output shaft 12a and a stator 12c which is arranged on an outer circumference of the rotor 12b coaxially and is fixed to the case 2. A lock mechanism 13 is provided on the output shaft 11a of the first MG 11. The lock mechanism 13 is configured so as to be allowed to switch between an engagement state where the output shaft 11a is locked so as not to rotate and a release state where the output shaft 11a locked is released and a rotation of the output shaft 11a is permitted. The lock mechanism 13 is configured as a meshing type brake. However, the lock mechanism 13 may be changed to a friction type brake.

An output shaft 10a of the engine 10 and the output shaft 11a of the first MG 11 are connected with a power split mechanism 14. An output portion 15 for transmitting power to drive wheels 3 of the vehicle 1 is also connected with the power split mechanism 14. The output portion 15 includes a first drive gear 16, a counter gear 18 which, while being meshed with the first drive gear 16, is fixed to an output shaft 17, and an output gear 19 which is fixed to the output shaft 17. The output gear 19 is meshed with a ring gear 20a which is provided in a case of a differential mechanism 20. The differential mechanism 20 is a well known mechanism which distributes power which is transmitted to the ring gear 20a to right and left drive wheels 3. In this figure, only one of the right and left drive wheels 3 is shown.

The power split mechanism 14 includes a planetary gear mechanism 21. The planetary gear mechanism 21 is a single pinion type planetary gear mechanism. The planetary gear mechanism 21 includes a sun gear S, a ring gear R, pinion gears P, and a carrier C. The sun gear S is an external gear. The ring gear R is an internal gear disposed coaxially with the sun gear S. The pinion gears P mesh with the sun gear S and the ring gear R respectively. The carrier C supports the pinion gears P so that the pinion gears P are capable of rotating and also capable of revolving around the sun gear S.

The sun gear S is connected with the output shaft 11a of the first MG 11. The carrier C is connected with the output shaft 10a of the engine 10. The ring gear R is connected with the first drive gear 16.

A second drive gear 22 is provided on the output shaft 12a of the second MG 12. The second drive gear 22 meshes with the counter gear 18.

The first MG 11 is connected electrically with a battery 24 via an electric circuit including a first inverter 23. Similarly, the second MG 12 is also connected electrically with the battery 24 via an electric circuit including a second inverter 25.

Figure 2:
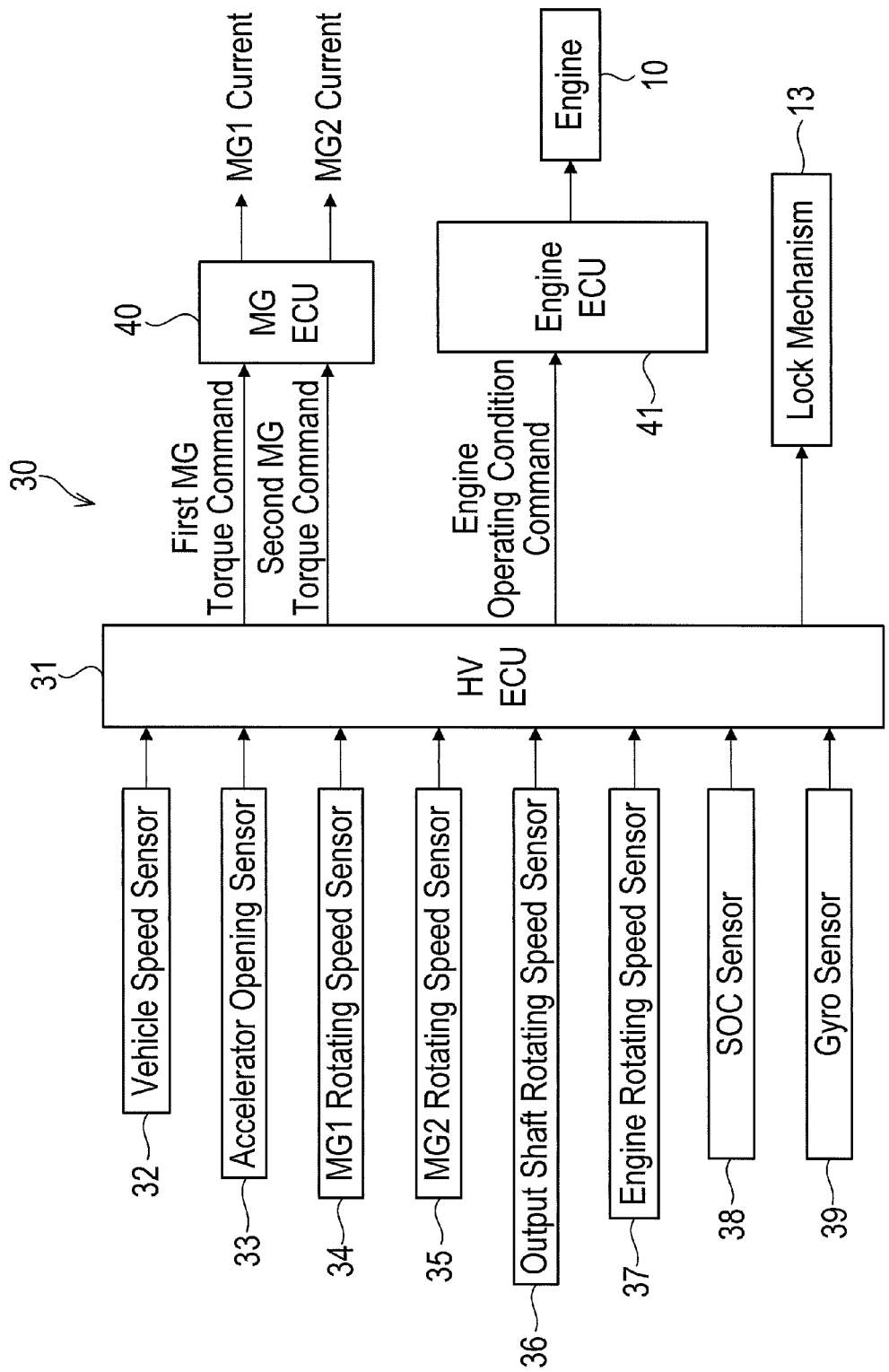
FIG. 2 is a block diagram showing a control system of the vehicle.

FIG. 2 shows a control apparatus 30 for controlling each part of the vehicle 1. The control apparatus 30 includes various electronic control units (ECU). Each ECU is configured as a computer unit including a microprocessor and peripheral devices, such as a RAM and a ROM, which are necessary for the operations of the microprocessor. To an HVECU 31, inputted are signals from various sensors. For example, output signals from a vehicle speed sensor 32, an accelerator opening sensor 33, an MG1 rotating speed sensor 34, an MG2 rotating speed sensor 35, an output shaft rotating speed sensor 36, an engine rotating speed sensor 37, an SOC sensor 38, a gyro sensor 39, and so on, are inputted to the HVECU 31. The vehicle speed sensor 32 outputs a signal corresponding to speed of the vehicle 1 (vehicle speed). The accelerator opening sensor 33 outputs a signal corresponding to an operation amount of an accelerator pedal (not shown), that is, an accelerator opening. The MG1 rotating speed sensor 34 outputs a signal corresponding to rotating speed of the output shaft 11a of the first MG 11. The MG2 rotating speed sensor 35 outputs a signal corresponding to rotating speed of the output shaft 12a of the second MG 12. The output shaft rotating speed sensor 36 outputs a signal corresponding to rotating speed of the output shaft 17. The engine rotating speed sensor 37 outputs a signal corresponding to rotating speed of the output shaft 10a of the engine 10. The SOC sensor 38 outputs a signal corresponding to a state of charge (SOC) of the battery 24. The gyro sensor 39 outputs a signal corresponding to a tilt with respect to front-back direction of the vehicle 1. Furthermore, if a car navigation system is mounted on the vehicle 1, then this system is also connected to the HVECU 31. In addition, various sensors are further connected to the HVECU 31, but they are omitted in the figure. Hereinafter, the rotating speed of the output shaft 11a of the first MG 11 is referred to as the rotating speed of the first MG 11. Furthermore, as with the first MG, the rotating speed of the output shaft 12a of the second MG 12 is referred to as the rotating speed of the second MG 12, and the rotating speed of the output shaft 10a of the engine 10 is referred to as the rotating speed of the engine 10.

The HVECU 31 calculates a torque which is generated by each of the first MG 11 and the second MG 12, and outputs commands to an MGECU 40 with regard to the torques to be generated. Furthermore, the HVECU 31 determines an operating condition of the engine 10, and outputs commands to an engine ECU 41 with regard to the operating condition of the engine 10. The HVECU 31 further controls the lock mechanism 13. In addition, the HVECU 31 further controls other objects to be controlled which are provided on the vehicle 1, but they are omitted in the figure.

The MGECU 40 calculates current values corresponding to the torques to be generated by the first MG 11 and the second MG 12 based on the commands which were inputted from the HVECU 31. And, the MGECU 40 controls the current value of each of the first MG 11 and the second MG 12. The engine ECU 41 performs various controls for various parts of the engine 10, such as a throttle valve, an ignition plug, and an injector, based on the commands which were inputted from the HVECU 31.

Figure 3:
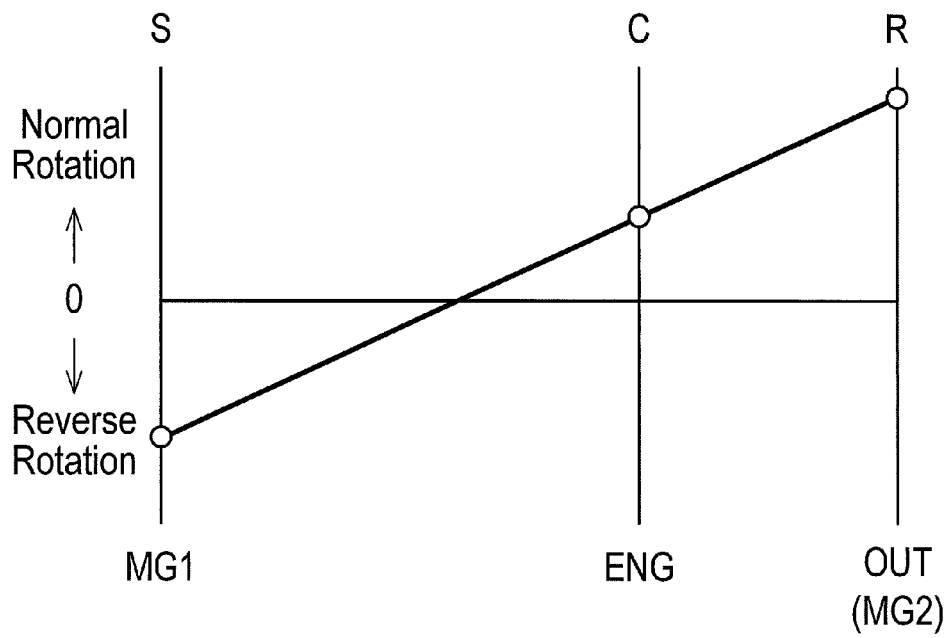
FIG. 3 is a diagram showing an example of an alignment chart of the power split mechanism in a variable gear ratio mode.
Figure 4:
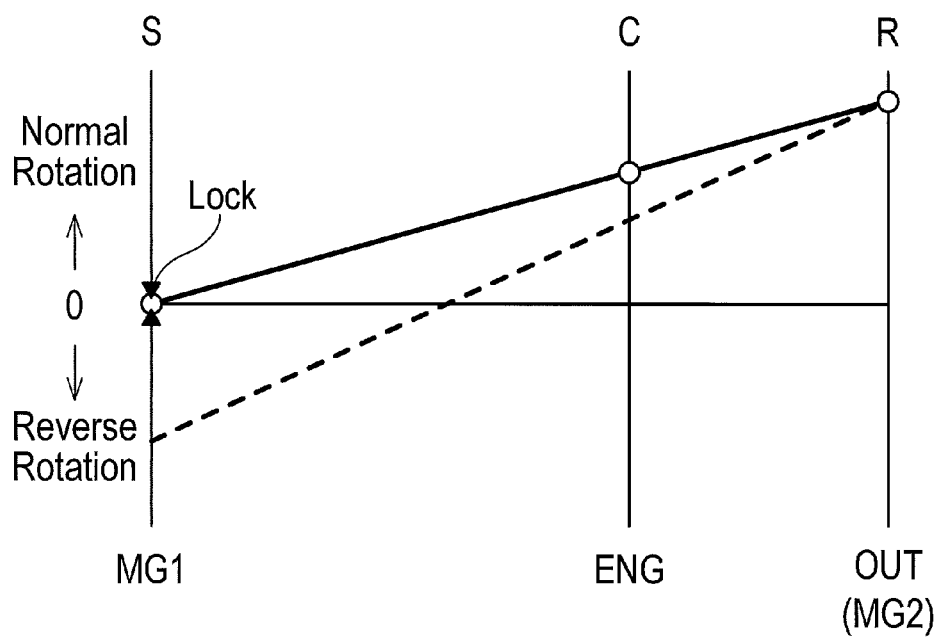
FIG. 4 is a diagram showing an example of an alignment chart of the power split mechanism in a fixed gear ratio mode.

In the vehicle 1, as modes of the power split mechanism 14, a variable gear ratio mode and a fixed gear ratio mode are provided. In the variable gear ratio mode, a state of the lock mechanism 13 is switched to the release state. On the other hand, in the fixed gear ratio mode, a state of the lock mechanism 13 is switched to the engagement state. FIG. 3 shows an example of an alignment chart of the power split mechanism 14 in the variable gear ratio mode. FIG. 4 shows an example of an alignment chart of the power split mechanism 14 in the fixed gear ratio mode. In FIG. 4, a relation in the variable gear ratio mode is shown by a broken line as a comparative example. In these figures, "MG1" shows the first MG 11, "ENG" shows the engine 10, "MG2" shows the second MG 12, and "OUT" shows the output shaft 17. Furthermore, "S" shows the sun gear S, "C" shows the carrier C, and "R" shows the ring gear R.

In the variable gear ratio mode, since the lock mechanism 13 is in the release state, a rotation of each of the output shaft 11a of the first MG 11 and the sun gear S is permitted. Thereby, as shown in FIG. 3, even though the rotating speed of the engine 10 is constant, by changing the rotating speed of the first MG 11 and a rotating direction of the first MG 11, it is possible to change the rotating speed of the output shaft 17 continuously. On the other hand, in the fixed gear ratio mode, since the lock mechanism 13 is switched to the engagement state, the output shaft 11a of the first MG 11 and the sun gear S are locked so as not to rotate. Thereby, as shown in FIG. 4, the rotating speed of the output shaft 17 is changed according to the rotating speed of the engine 10. As is obvious from this figure, in the fixed gear ratio mode, the rotating speed of the sun gear S is fixed to zero. Thereby, a gear ratio of the power split mechanism 14 is fixed in a state where the rotating speed of the output shaft 17 is greater than the rotating speed of the engine 10, that is, an overdrive state.

Figure 5:
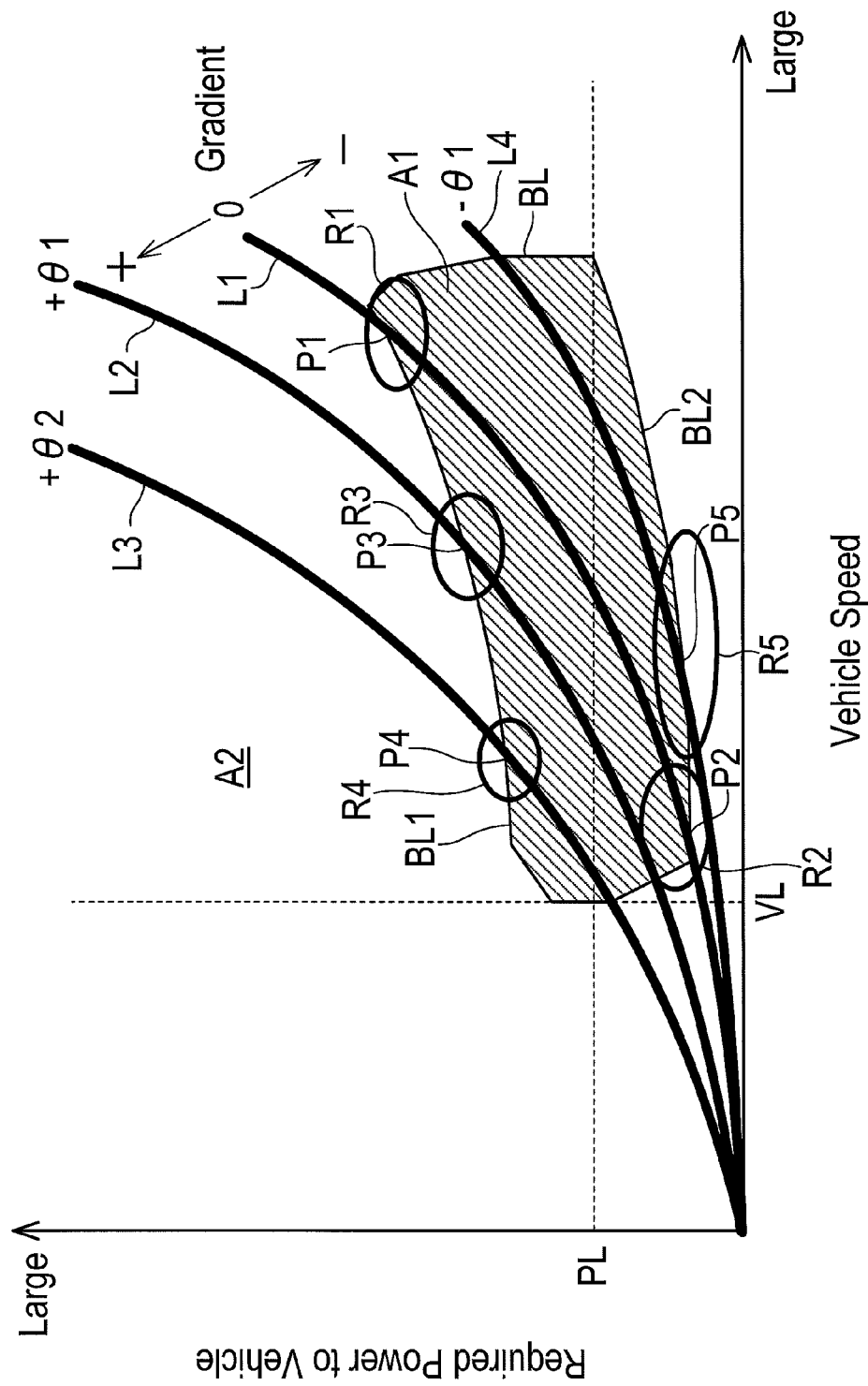
FIG. 5 is a diagram showing an example of relations between a vehicle speed, a required power to the vehicle, and gear ratio modes.

The HVECU 31 switches these gear ratio modes according to the vehicle speed and required power to the vehicle 1. In the required power, power required to generate electricity by the first MG 11 is also included. FIG. 5 shows an example of a map which is used to a switching control of the gear ratio modes. This figure shows an example of relations between the vehicle speed, the required power to the vehicle 1, and gear ratio modes. A region A1 of this figure is an operating region (hereinafter, referred to as a lock region) where the gear ratio mode is switched to the fixed gear ratio mode. The lock region A1 is an operating region where fuel efficiency is better when the vehicle 1 travels in the fixed gear ratio mode as compared with a case that the vehicle 1 travels in the variable gear ratio mode.

The HVECU 31 switches the gear ratio mode to the fixed gear ratio mode when an operating point of the vehicle 1 which is specified by the vehicle speed and the required power is in the lock region A1. On the other hand, when the operating point of the vehicle 1 is in a region (hereinafter, referred to as a not-lock region) A2, which is other than the lock region A1, the HVECU 31 switches the gear ratio mode to the variable gear ratio mode. However, in the vehicle 1, a lower limit vehicle speed VL where a switching to the fixed gear ratio mode is limited is set. Thereby, when the vehicle speed is equal to or lower than the lower limit vehicle speed VL, the HVECU 31 switches the gear ratio mode to the variable gear ratio mode. The relations shown in this figure may be obtained in advance through experiments, numerical calculations, or the like, and stored as a map in the ROM of the HVECU 31.

Figure 6:
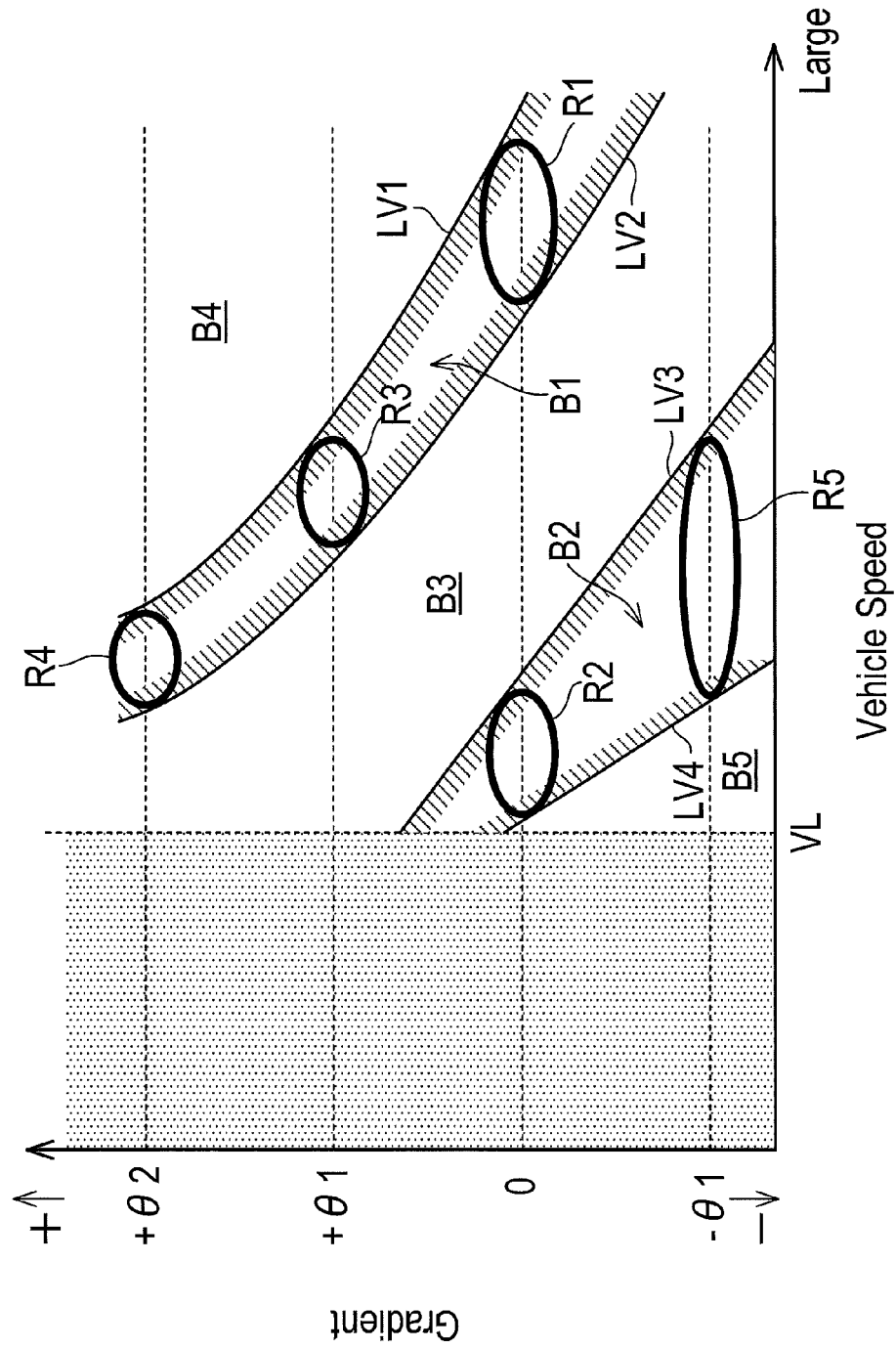
FIG. 6 is a diagram showing an example of a relation between the vehicle speed, a gradient, and regions indicating whether or not a switching control is prohibited.

Furthermore, the HVECU 31 determines whether or not the switching control of the gear ratio mode by using the map in FIG. 5 is prohibited based on a gradient of a road where the vehicle 1 is traveling and the vehicle speed. And, when it is determined that the switching control is prohibited, the gear ratio mode is maintained in the variable gear ratio mode or the fixed gear ratio mode. The gradient shows a rate of change of a height in a vertical direction to a distance in a horizontal direction. For example, when the height increases 10 meters with respect to the distance of 100 meters in the horizontal direction, the gradient is +10%. On the other hand, when the height decreases 10 meters with respect to the distance of 100 meters in the horizontal direction, the gradient is −10%. FIG. 6 shows a correspondence relation between the vehicle speed, the gradient, and regions indicating whether or not the switching control is prohibited. A region B1 in this figure indicates a region where the switching control is prohibited and the lock mechanism 13 is maintained in the release state. Hereinafter, the region 31 is referred to as a lock prohibition region. A region B2 indicates a region where the switching control is prohibited and the lock mechanism 13 is maintained in the engagement state. Hereinafter, the region B2 is referred to as a lock maintaining region. Remaining regions B3-B5 indicate regions where the switching control is permitted. Hereinafter, each of the regions B3-B5 is referred to as a control permission region.

A setting method of the regions B1, B2 where the switching control is prohibited will be described with reference to FIG. 5. Lines L1-L4 in FIG. 5 show operating lines, in other words correspondence relations between the vehicle speed, the gradient, and the required power, when the vehicle 1 travels in a steady travelling state on roads of various gradients. For example, the line L2 shows that a required power P is required when the vehicle 1 travels in the steady travelling state on an upward slope where its gradient is +θ1%. The regions B1, B2 are set based on relations shown by the lock region A1 and these lines L1-L4. As shown in this figure, a boundary line BL between the lock region A1 and the not-lock region A2 and each of the lines L1-L4 are intersected with each other. In the boundary line BL, a line (hereinafter, referred to as an upper limit line) BL1 shows an upper limit of the required power of the lock region A1, and a line (hereinafter, referred to as a lower limit line) BL2 shows a lower limit of the required power of the lock region A1. The regions B1, B2 are set based on operating points P1-P5 where the upper limit line BL1 and the lower limit line BL2 are intersected with the lines L1-L4.

As shown in this figure, the line L1 which shows the relation in the case of the gradient 0%, is intersected with the upper limit line BL1 at the operating point P1. Furthermore, the line L1 is intersected with the lower limit line BL2 at the operating point P2. The line L2 which shows the relation in the case of the gradient +θ1%, is intersected with the upper limit line BL1 at the operating point P3. The line L3 which shows the relation in the case of the gradient +θ2%, is intersected with the upper limit line BL1 at the operating point P4. +θ2 is greater than +θ1. The line L4 which shows the relation in the case of the gradient −θ1%, is intersected with the upper limit line BL1 at the operating point P5. And, as shown in this figure, control prohibition ranges R1 to R5 are set for the operating points P1-P5 respectively. Each control prohibition range R1-R5 is set on the basis of each operating point P1-P5, by a predetermined vehicle speed range and a predetermined required power range around each operating point P1-P5. A size of each range R1-R5 is set appropriately according to each operating point P1-P5 so that the switching of the gear ratio modes is not occurred frequently when the vehicle 1 travels on a slope. For example, a vehicle speed range of the control prohibition range R5 corresponding to the operating point P5 is larger than vehicle speed ranges of other control prohibition ranges R1-R4 corresponding to the operating points P1-P4. This is because the line L4 and the lower limit line BL2 are close to each other around the operating point P5.

The ranges R1-R5 in FIG. 6 show the control prohibition ranges R1-R5. And, the region B1 is set based on the control prohibition ranges R1, R3, and R4. Specifically, a range which is sandwiched between a line LV1 which connects maximum values of the vehicle speeds of the control prohibition ranges R1, R3, and R4 and a line LV2 which connects minimum values of the vehicle speeds of the control prohibition ranges R1, R3, and R4 is set as the lock prohibition region B1. As shown in FIG. 5, in a case that the accelerator pedal is stepped on when the operating point of the vehicle 1 is within any one of the control prohibition ranges R1, R3, and R4, the operating point of the vehicle 1 enters the not-lock region A2. On the other hand, when the accelerator pedal is released, the operating point of the vehicle 1 passes through the lock region A1 temporarily and enters the not-lock region A2 again. Thereby, in these control prohibition ranges R1, R3, and R4, maintaining the variable gear ratio mode would provide higher possibility that the operating point of the vehicle 1 remains in a good fuel efficiency region. So, the region B1 specified by these control prohibition ranges R1, R3, and R4 is set as the lock prohibition region.

On the other hand, the region B2 is set based on the control prohibition ranges R2 and R5. Specifically, a range which is sandwiched between a line LV3 which connects maximum values of the vehicle speeds of the control prohibition ranges R2 and R5 and a line LV4 which connects minimum values of the vehicle speeds of the control prohibition ranges R2 and R5 is set as the region B2. As shown in FIG. 5, in a case that the accelerator pedal is stepped on when the operating point of the vehicle 1 is within any one of the control prohibition ranges R2 and R5, the operating point of the vehicle 1 enters the lock region A1. On the other hand, when the accelerator pedal is released, the operating point of the vehicle 1 enters the not-lock region A2. Thereby, in the control prohibition ranges R2 and R5, maintaining the fixed gear ratio mode would provide higher possibility that the operating point of the vehicle 1 remains in a good fuel efficiency region. So, the region B2 specified by the control prohibition ranges R2 and R5 is set as the lock maintaining region. The relation shown in FIG. 6 is obtained by above described method, and stored as a map in the ROM of the HVECU 31.

Figure 7:
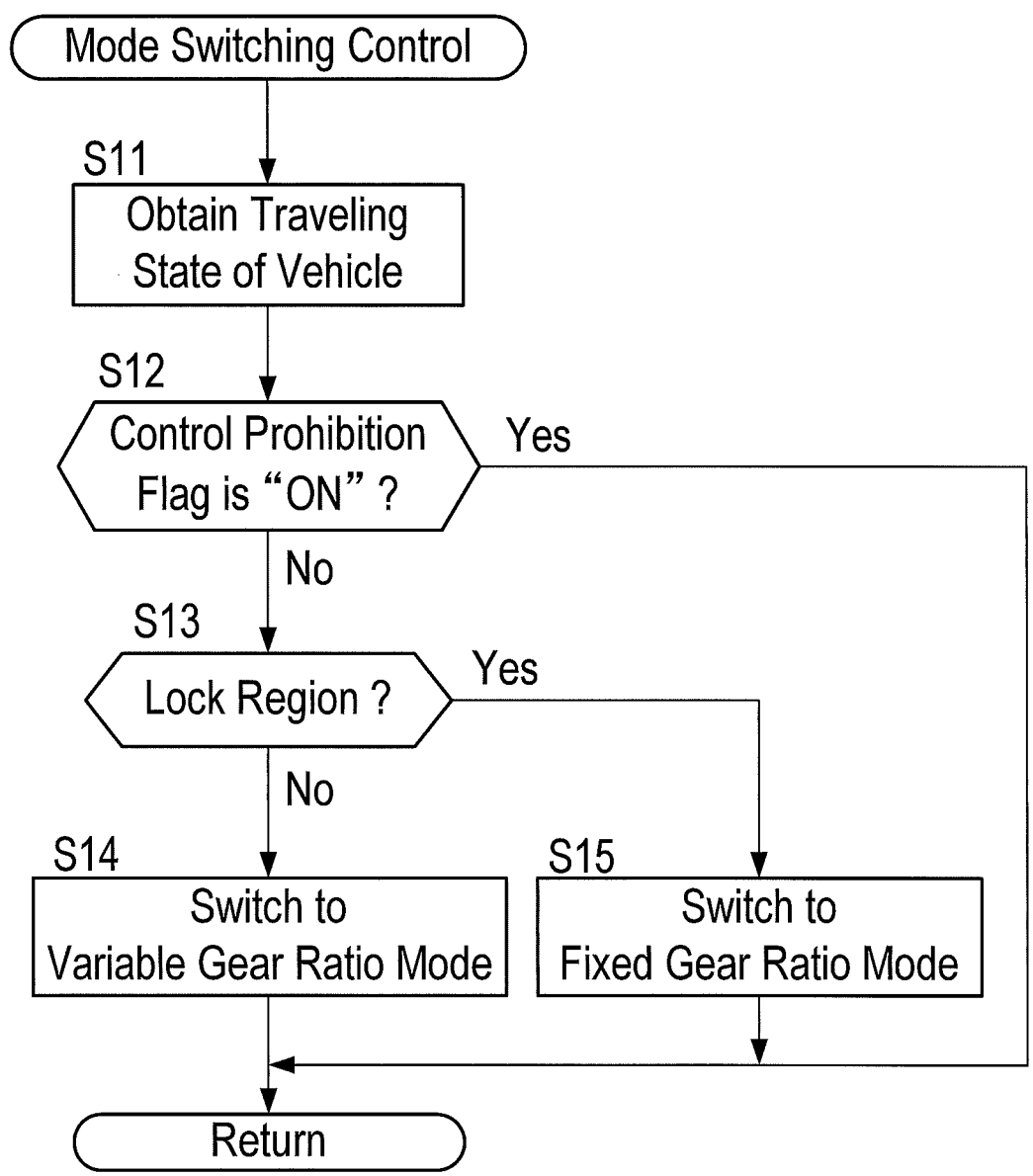
FIG. 7 is a flowchart showing a mode switching control routine executed by a HVECU.
Figure 8:
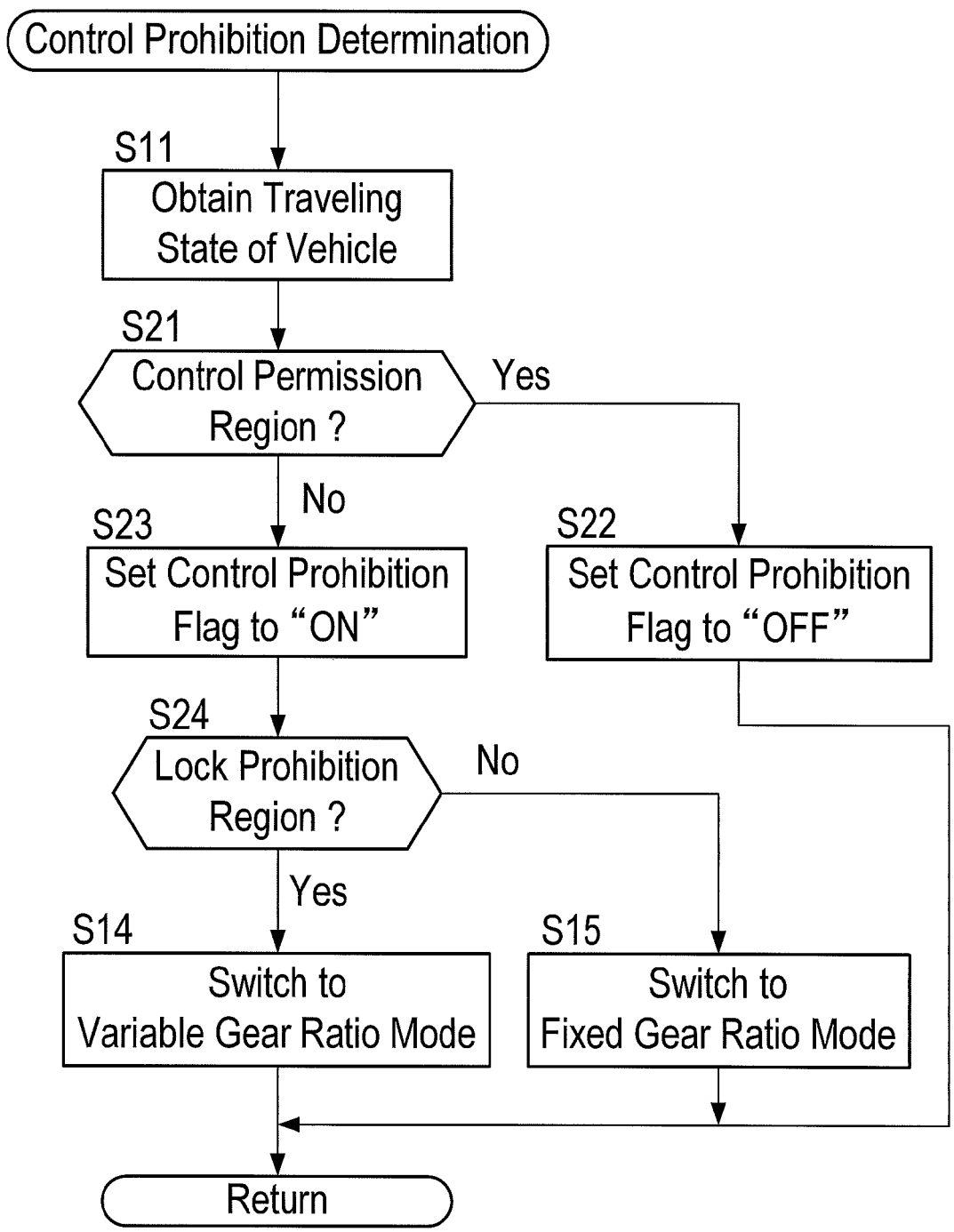
FIG. 8 is a flowchart showing a control prohibition determination routine executed by the HVECU.

FIG. 7 shows a mode switching control routine which the HVECU 31 executes for switching the gear ratio modes by using the map shown in FIG. 5. FIG. 8 shows a control prohibition determination routine which the HVECU 31 executes for determining whether or not the switching control of the gear ratio mode is permitted based on the map shown in FIG. 6. The HVECU 31 repeatedly executes these routines at predetermined intervals while the vehicle 1 is traveling.

First, the control routine of FIG. 7 will be described. In the control routine, the HVECU 31 first obtains a traveling state of the vehicle 1 in step S11. As the traveling state, the HVECU 31 obtains the vehicle speed, the accelerator opening, the rotating speed of the first MG 11, the rotating speed of the second MG 12, the rotating speed of the output shaft 17, the rotating speed of the engine 10, the SOC of the battery 24, and the tilt with respect to front-back direction of the vehicle 1, for example. In this process, the HVECU 31 also obtains the required power to the vehicle 1 based on the accelerator opening and the SOC of the battery 24. Furthermore, in this process, the HVECU 31 also obtains the gradient of the road based on the tilt with respect to front-back direction of the vehicle 1.

In next step S12, the HVECU 31 determines whether or not a state of a control prohibition flag is "ON". The control prohibition flag is a flag which indicates whether the switching control of the gear ratio mode using the map in FIG. 5 is prohibited or not. The control prohibition flag is set in the routine of FIG. 8. When the HVECU 31 determines that the state of the control prohibition flag is "ON", the HVECU 31 ends the present control routine.

On the other hand, when the HVECU 31 determines that the state of the control prohibition flag is "OFF", the HVECU 31 goes to step S13 and determines whether or not the operating point of the vehicle 1 which is specified by the vehicle speed and the required power to the vehicle 1 is within the lock region A1 of FIG. 5. When the HVECU 31 determines that the operating point of the vehicle 1 is within the unlock region A2, the HVECU 31 goes to step S14 and switches the gear ratio mode to the variable gear ratio mode by switching the lock mechanism 13 to the release state. In addition, when the present gear ratio mode is the variable gear ratio mode, the present gear ratio mode is maintained. Thereafter, the HVECU 31 ends the present control routine.

On the other hand, when the HVECU 31 determines that the operating point of the vehicle 1 is within the lock region A1, the HVECU 31 goes to step S15 and switches the gear ratio mode to the fixed gear ratio mode by switching the lock mechanism 13 to the engagement state. When the present gear ratio mode is the fixed gear ratio mode, the present gear ratio mode is maintained. Thereafter, the HVECU 31 ends the present control routine.

Next, the control prohibition determination routine of FIG. 8 will be described. In FIG. 8, the same processes as those of the routine of FIG. 7 are denoted by the same reference numerals respectively, and descriptions thereof will be omitted.

In this routine, the HVECU 31 first obtains a traveling state of the vehicle 1 in step S11. In next step S21, the HVECU 31 determines whether or not the operating point of the vehicle 1 which is specified by the vehicle speed and the gradient is within any one of the control permission regions B3 to B5 of FIG. 6. This determination may be executed based on the vehicle speed, the gradient, and the map of FIG. 6. When the HVECU 31 determines that the operating point of the vehicle 1 is within any one of the control permission regions B3 to B5, the HVECU 31 goes to step S22 and switches the state of the control prohibition flag to "OFF". Thereafter, the HVECU 31 ends the present routine.

On the other hand, when the HVECU 31 determines that the operating point of the vehicle 1 is within the region other than the control permission regions B3 to B5, the HVECU 31 goes to step S23 and switches the state of the control prohibition flag to "ON". In next step S24, the HVECU 31 determines whether or not the operating point of the vehicle 1 which is specified by the vehicle speed and the gradient is within the lock prohibition region B1 of FIG. 6. When the HVECU 31 determines that the operating point of the vehicle 1 is within the lock prohibition region 31, the HVECU 31 goes to step S14 and switches the gear ratio mode to the variable gear ratio mode. When the present gear ratio mode is the variable gear ratio mode, the present gear ratio mode is maintained. Thereafter, the HVECU 31 ends the present routine.

On the other hand, when the HVECU 31 determines that the operating point of the vehicle 1 is not within the lock prohibition region B1, that is, the operating point of the vehicle 1 is within the lock maintaining region B2, the HVECU 31 goes to step S15 and switches the gear ratio mode to the fixed gear ratio mode. When the present gear ratio mode is the fixed gear ratio mode, the present gear ratio mode is maintained. Thereafter, the HVECU 31 ends the present routine.

As described above, in the present invention, it is determined whether or not the switching control of the gear ratio mode is permitted according to the gradient of the road and the vehicle speed. And, when the operating point of the vehicle 1 is within the lock prohibition region B1 or the lock maintaining region B2 in FIG. 6, the gear ratio mode is switched to the variable gear ratio mode or the fixed gear ratio mode, and the switching control of the gear ratio mode is prohibited. In the present invention, since the switching of the gear ratio modes is controlled according to the gradient of the road, it is possible to suppress, as compared with a conventional technique, an occurrence of frequent switching of the gear ratio modes, the frequent switching occurring because of an influence of the gradient of the road.

In the present invention, as shown in FIG. 6, the range which is sandwiched between the line LV1 and the line LV2 is set as the lock prohibition region B1, and the range which is sandwiched between the line LV3 and the line LV4 is set as the lock continuation region B2. Thereby, operating regions where the switching control is permitted are provided in an operating region where the vehicle speed is higher than the line LV1 and an operation region where the vehicle speed is lower than the line LV4 respectively. Due to this, it is possible to prevent an unnecessary prohibition with respect to the switching control. Thereby, it is possible to improve fuel efficiency.

Figure 9:
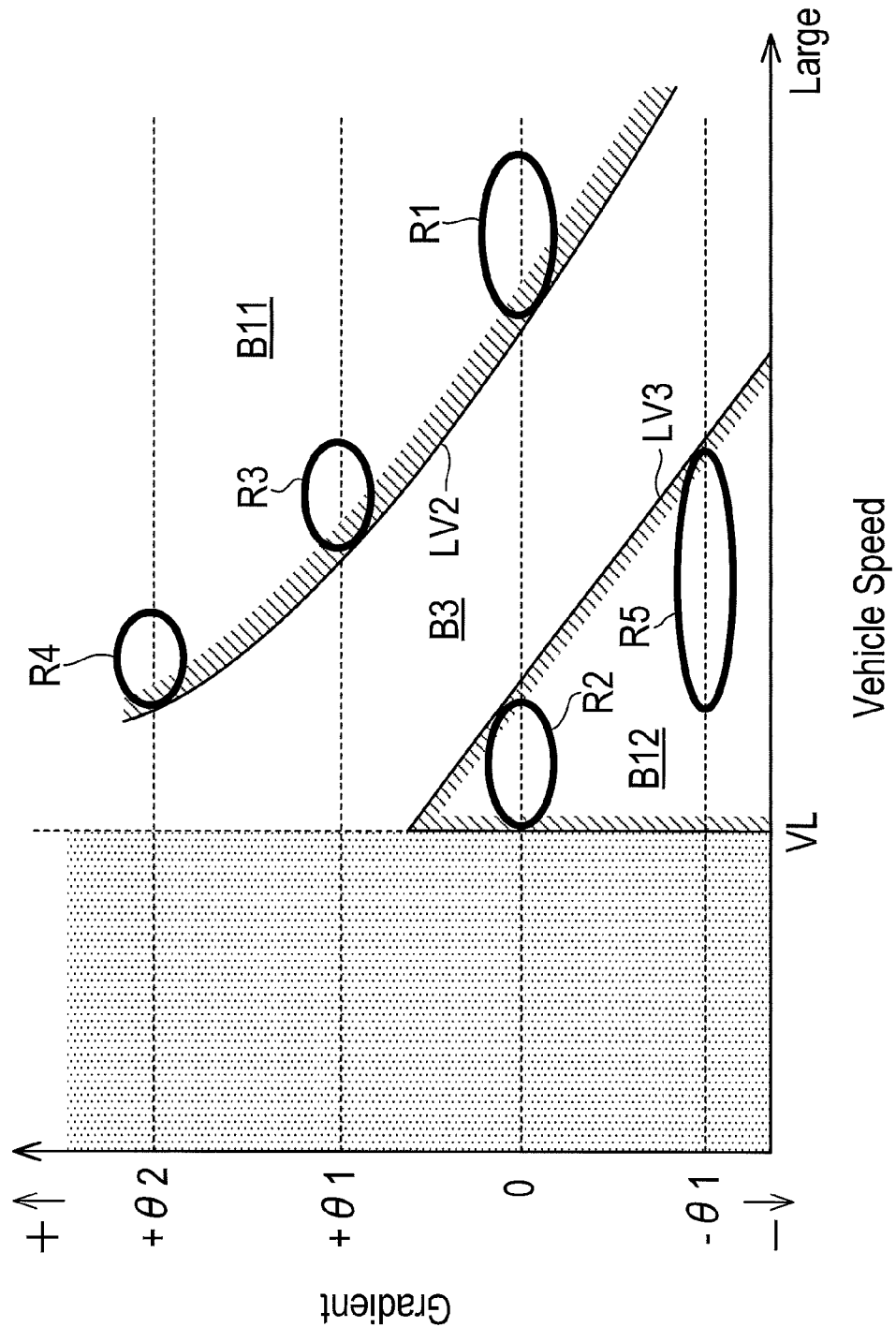
FIG. 9 is a diagram showing another example of a relation between the vehicle speed, the gradient, and the regions indicating whether or not the switching control is prohibited.

In the present invention, the map which is used to the determination whether or not the switching control is prohibited is not limited to the map shown in FIG. 6. For example, the determination may be performed by using a map shown in FIG. 9 instead of the map of FIG. 6. In FIG. 9, the same components as those in FIG. 6 are denoted by the same reference numerals, and descriptions thereof will be omitted.

In the map of FIG. 9, a region which is located on an upper right side than the line LV2 in this figure is set as a lock prohibition region B11, and a region which is located on a lower left side than the line LV3 in this figure is set as a lock maintaining region B12. The map is the same as the map shown in FIG. 6 except that the lock prohibition region B11 and the lock maintaining region B12 are different. Thereby, the lock prohibition region B11 is set so as to include a region where the vehicle speed is greater than the control permission region B3 and also the gradient is greater than the control permission region B3. On the other hand, the lock maintaining region B12 is set so as to include a region where the vehicle speed is smaller than the control permission region B3 and also the gradient is smaller than the control permission region B3. By setting the lock prohibition region B11 and the lock maintaining region B12 in this manner, a region where the switching control of the gear ratio mode is permitted is decreased as compared to the map of FIG. 6. Thereby, it is possible to decrease a frequency of the occurrence of the switching of the gear ratio modes.

Figure 10:
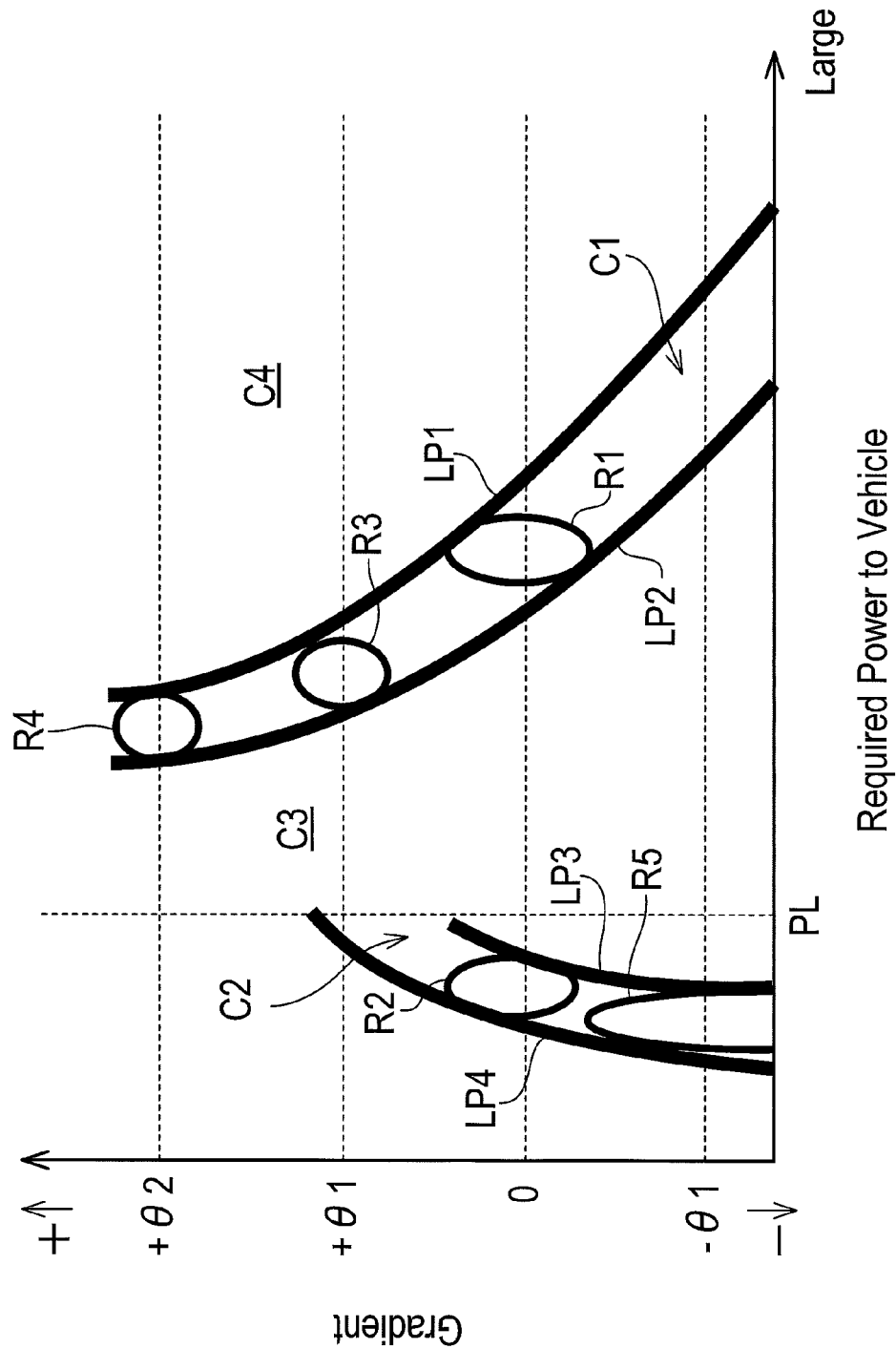
FIG. 10 is a diagram showing an example of a relation between the required power to the vehicle, the gradient, and the regions indicating whether or not the switching control is prohibited.

In the map of FIG. 6 and the map of FIG. 9, it is determined whether or not the switching control is prohibited based on the vehicle speed and the gradient. However, in the present invention, it may be determined whether or not the switching control is prohibited based on the required power to the vehicle 1 and the gradient. FIG. 10 shows an example of a relation between the required power to the vehicle 1, the gradient of the road, and regions indicating whether or not the switching control is prohibited. In this figure, the same components as those in FIG. 6 are denoted by the same reference numerals, and descriptions thereof will be omitted.

As is obvious in FIG. 10, the relation shown in this figure is also set based on the control prohibition ranges R1 to R5. A lock prohibition region C1 is set based on the control prohibition ranges R1, R3, and R4. Specifically, a range which is sandwiched between a line LP1 which connects maximum values of the required power of these control prohibition ranges R1, R3, and R4 and a line LP2 which connects minimum values of the required power of these control prohibition ranges R1, R3, and R4 is set as the lock prohibition region C1. As described above, in a case that the operating point of the vehicle 1 is within any one of the control prohibition ranges R1, R3, R4, maintaining the variable gear ratio mode would provide higher possibility that the operating point of the vehicle 1 remains in a good fuel efficiency region. So, the region C1 specified by these control prohibition ranges R1, R3, and R4 is set as the lock prohibition region.

On the other hand, a lock maintaining region C2 is set based on the control prohibition ranges R2 and R5. Specifically, a range which is sandwiched between a line LP3 which connects maximum values of the required power of the control prohibition ranges R2 and R5 and a line LP4 which connects minimum values of the required power of the control prohibition ranges R2 and R5 is set as the region C2. As described above, in a case that the operating point of the vehicle 1 is within any one of the control prohibition ranges R2 and R5, maintaining the fixed gear ratio mode would provide higher possibility that the operating point of the vehicle 1 remains in a good fuel efficiency region. So, the region C2 specified by the control prohibition ranges R2 and R5 is set as the lock maintaining region. Furthermore, the lock maintaining region C2 is also specified by upper limit power PL. As shown in FIG. 5, the highest value in the lower limit line BL2 of the required power of the lock region A1 is set as the upper limit power PL.

And, in the map of FIG. 10, regions C3 and C4 other than the lock prohibition region C1 and the lock maintaining region C2 is set as the control permission regions.

Figure 11:
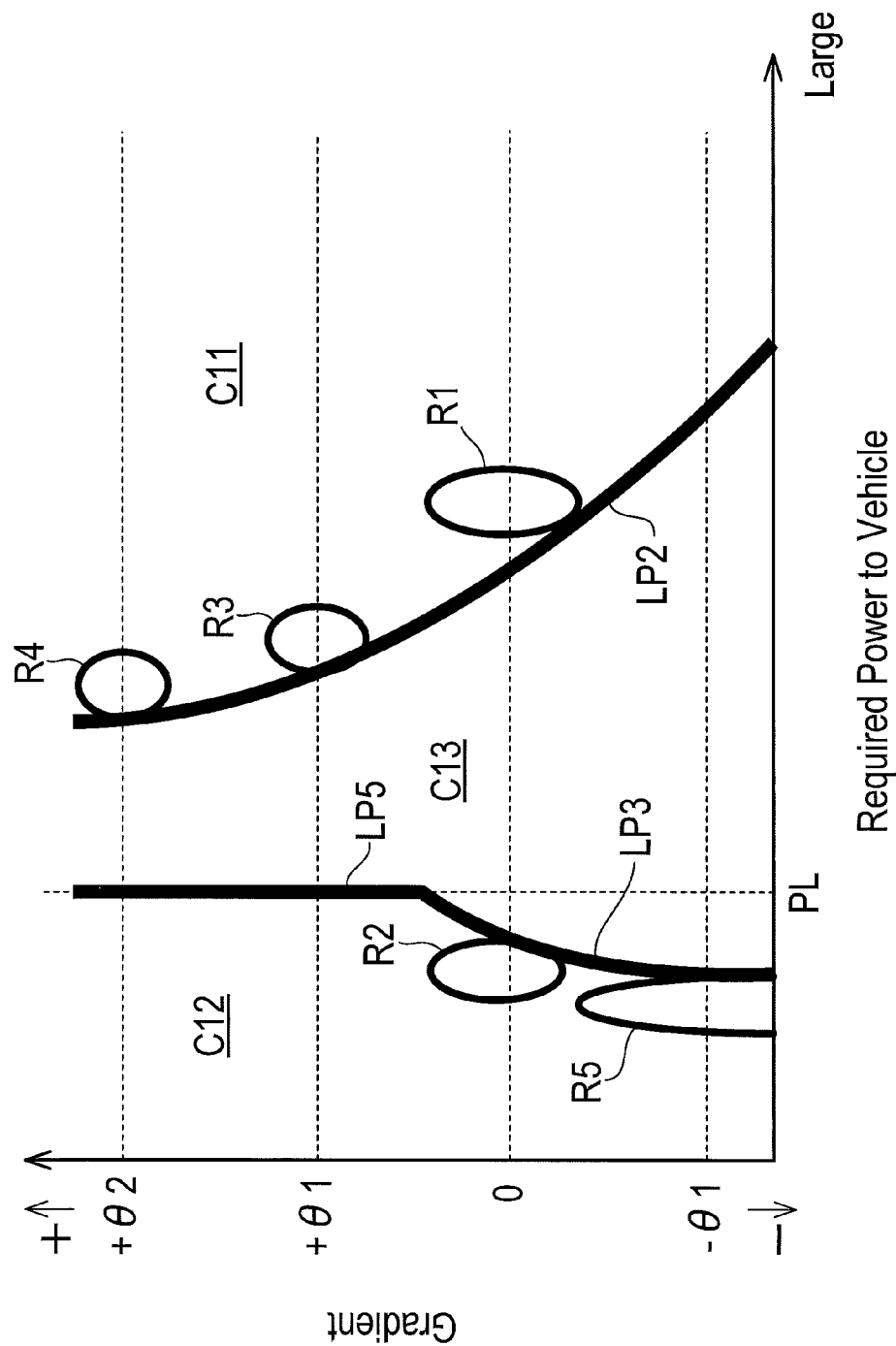
FIG. 11 is a diagram showing another example of a relation between the required power to the vehicle, the gradient, and the regions indicating whether or not the switching control is prohibited.

FIG. 11 shows other example of a relation between the required power to the vehicle 1, the gradient of the road, and the regions indicating whether or not the switching control is prohibited. In this figure, the same components as those in FIG. 10 are denoted by the same reference numerals, and descriptions thereof will be omitted.

In the relation of FIG. 11, a region which is located on an upper right side than the line LP2 in this figure is set as a lock prohibition region C11. A region which is located on a left side of the line LP5 specified by the line LP3 and the upper limit power PL is set as a lock maintaining region C12. And, a region between the lock prohibition region C11 and the lock maintaining region C12 is set as a control permission region C13. Thereby, the lock prohibition region C11 is set so as to include a region where the required power is greater than the control permission region C13. On the other hand, the lock maintaining region C12 is set so as to include a region where the required power is smaller than the control permission region C13. By setting the regions C11, C12, and C13 in this manner, a region where the switching control of the gear ratio mode is permitted is decreased as compared to the relation of FIG. 10. Thereby, it is possible to decrease a frequency of the occurrence of the switching of the gear ratio modes.

Even when it is determined whether or not the switching control is permitted based on the required power to the vehicle 1 and the gradient in this manner, it is possible to control the switching of the gear ratio modes according to the gradient of the road. Thereby, it is possible to suppress, as compared with a conventional technique, an occurrence of frequent switching of the gear ratio modes, the frequent switching occurring because of an influence of the gradient of the road.

In addition, it may be determined whether or not the switching control is permitted based on the vehicle speed, the required power to the vehicle 1, and the gradient of the road.

In the above-described embodiment, each of the first MG 11 and the second MG 12 correspond to an electric motor of the present invention. The power split mechanism 14 corresponds to a power transmission mechanism of the present invention. By executing the control routine of FIG. 7, the HVECU 31 functions as a control device of the present invention. By executing the control routine of FIG. 8, the HVECU 31 functions as a control prohibition device of the present invention. By storing the maps of FIG. 6 and FIGS. 9 to 11, the HVECU 31 corresponds to a storage device of the present invention. The upper limit line BL1 corresponds to an upper limit line of the present invention, and the lower limit line BL2 corresponds to a lower limit line of the present invention. The lines L1 to L4 correspond to operating lines of the present invention. The operating points P1 to P5 correspond to operating points of the present invention.

The present invention is not limited to the above-described embodiments, and various modifications of the present invention may be provided. For example, an engine to which the present invention is applied is not limited to the spark ignition type internal combustion engine. The present invention may be applied to a compression-ignition type diesel engine.

The number of the planetary gear mechanism which is provided in the power split mechanism is not limited to one. The power split mechanism may be configured by two or more planetary gear mechanisms. Furthermore, a method for switching the state of the power split mechanism to the fixed gear ratio mode is not limited to the method where the first MG is locked. Various methods which are capable to fix the relation between the rotating speed of the internal combustion engine and the rotating speed of the output portion in the overdrive state, may be applied to the present invention.

Furthermore, in the present invention, a method to obtain the gradient of the road is not limited to the method where the gradient is obtained based on the output signal of the gyro sensor. For example, the gradient of the road may be obtained based on map information which is stored in a car navigation system. Furthermore, a relation between a travel load in the steady traveling state and the gradient may be obtained in advance through experiments, numerical calculations, or the like, and stored as a map in the ROM of the HVECU. And, the gradient of the road may be obtained based on this map and the travel load in the steady traveling state.

What is claimed:

1. A control apparatus which is applied to a hybrid vehicle comprising:
an internal combustion engine and an electric motor as driving sources;
a power transmission mechanism which changes and transmits to an output portion transmitting torque to a drive wheel, a rotating speed of the internal combustion engine, the power transmission mechanism being built so as to switch a gear ratio mode of the power transmission mechanism between a variable gear ratio mode and a fixed gear ratio mode; and
a computer,
the control apparatus comprising:
a control device that the computer functioning as by implementing a computer program, and the control device being configured to control the power transmission mechanism to switch the gear ratio modes based on a required power to the vehicle and a vehicle speed,
a gradient detecting device which detects a gradient of a road where the vehicle travels,
a control prohibition device that the computer further functions as by implementing the computer program, and the control prohibition device being configured to determine whether or not a switching of the sear ratio modes performed by the control device is prohibited according to the detected gradient of the road where the vehicle travels in relation to at least any one of the required power and the vehicle speed, and to maintain the gear ratio mode in the variable gear ratio mode or the fixed gear ratio mode when it is determined that the switching of the gear ratio modes is prohibited, and
a storage device which stores a map where a control permission region where the switching of the gear ratio modes is permitted, a lock maintaining region where the gear ratio mode is maintained in the fixed gear ratio mode, and a lock prohibition region where the gear ratio mode is maintained in the variable gear ratio mode are set so as not to overlap with each other, in a region which is specified by the vehicle speed and the gradient, wherein
the control prohibition device is configured to determine whether or not the switching of the gear ratio modes is prohibited based on the map,
the lock prohibition region is set based on a maximum value and a minimum value of each of predetermined vehicle speed ranges, the predetermined vehicle speed range lying around an operating point where an upper limit line of the required power and an operating line are intersected each other, the upper limit line being one of boundary lines between a lock region where the gear ratio mode is switched to the fixed gear ratio mode and a not-lock region where the gear ratio mode is switched to the variable gear ratio mode, the lock region and the not-lock region being specified by the vehicle speed and the required power, the operating line being obtained in a case that the vehicle travels in a steady traveling state on a road where the gradient is a predetermined magnitude and being specified by the vehicle speed and the required power, and
the lock maintaining region is set based on a maximum value and a minimum value of each of predetermined vehicle speed ranges, the predetermined vehicle speed range lying around an operating point where a lower limit line of the required power which is one of the boundary lines and the operating line are intersected with each other.

2. A control apparatus which is applied to a hybrid vehicle comprising:
- an internal combustion engine and an electric motor as driving sources;
- a power transmission mechanism which changes and transmits to an output portion transmitting torque to a drive wheel, a rotating speed of the internal combustion engine, the power transmission mechanism being built so as to switch a gear ratio mode of the power transmission mechanism between a variable gear ratio mode and a fixed gear ratio mode; and
- a computer, the control apparatus comprising:
- a control device that the computer functioning as by implementing a computer program, and the control device being configured to control the power transmission mechanism to switch the near ratio modes based on a required power to the vehicle and a vehicle speed,
- a gradient detecting device which detects a gradient of a road where the vehicle travels,
- a control prohibition device that the computer further functions as by implementing the computer program, and the control prohibition device being configured to determine whether or not a switching of the gear ratio modes performed by the control device is prohibited according to the detected gradient of the road where the vehicle travels in relation to at least any one of the required power and the vehicle speed, and to maintain the gear ratio mode in the variable gear ratio mode or the fixed gear ratio mode when it is determined that the switching of the gear ratio modes is prohibited, and
- a storage device which stores a map where a control permission region where the switching of the gear ratio modes is permitted, a lock maintaining region where the gear ratio mode is maintained in the fixed gear ratio mode, and a lock prohibition region where the gear ratio mode is maintained in the variable gear ratio mode are set so as not to overlap with each other, in a region which is specified by the vehicle speed and the gradient, wherein
- the control prohibition device is configured to determine whether or not the switching of the gear ratio modes is prohibited based on the map,
- the lock prohibition region is set so as to include a region where the vehicle speed and the gradient are greater than the vehicle speed and the gradient of the control permission region, and
- the lock maintaining region is set so as to include a region where the vehicle speed and the gradient are smaller than the vehicle speed and the gradient of the control permission region respectively.

3. A control apparatus which is applied to a hybrid vehicle comprising:
- an internal combustion engine and an electric motor as driving sources;
- a power transmission mechanism which changes and transmits to an output portion transmitting torque to a drive wheel, a rotating speed of the internal combustion engine, the power transmission mechanism being built so as to switch a gear ratio mode of the power transmission mechanism between a variable gear ratio mode and a fixed gear ratio mode; and
- a computer, the control apparatus comprising:
- a control device that the computer functioning as by implementing a computer program, and the control device being configured to control the power transmission mechanism to switch the gear ratio modes based on a required power to the vehicle and a vehicle speed,
- a gradient detecting device which detects a gradient of a road where the vehicle travels,
- a control prohibition device that the computer further functions as by implementing the computer program, and the control prohibition device being configured to determine whether or not a switching of the gear ratio modes performed by the control device is prohibited according to the detected gradient of the road where the vehicle travels in relation to at least any one of the required power and the vehicle speed, and to maintain the gear ratio mode in the variable gear ratio mode or the fixed gear ratio mode when it is determined that the switching of the gear ratio modes is prohibited, and
- a storage device which stores a map where a control permission region where the switching of the gear ratio modes is permitted, a lock maintaining region where the gear ratio mode is maintained in the fixed gear ratio mode, and a lock prohibition region where the gear ratio mode is maintained in the variable gear ratio mode are set so as not to overlap with each other, in a region which is specified by the required power and the gradient, wherein
- the control prohibition device is configured to determine whether or not the switching of the gear ratio modes is prohibited based on the map,
- the lock prohibition region is set based on a maximum value and a minimum value of each of predetermined required power ranges, the predetermined required power range lying around an operating point where an upper limit line of the required power and an operating line are intersected each other, the upper limit line being one of boundary lines between a lock region where the gear ratio mode is switched to the fixed gear ratio mode and a not-lock region where the gear ratio mode is switched to the variable gear ratio mode, the lock region and the not-lock region being specified by the vehicle speed and the required power, the operating line being obtained in a case that the vehicle travels on a road where the gradient is a predetermined magnitude in a steady traveling state and being specified by the vehicle speed and the required power, and
- the lock maintaining region is set based on a maximum value and a minimum value of each of predetermined required power ranges, the predetermined required power range lying around an operating point where a lower limit line of the required power which is one of the boundary lines and the operating line are intersected with each other.

4. A control apparatus which is applied to a hybrid vehicle comprising:
- an internal combustion engine and an electric motor as driving sources;
- a power transmission mechanism which changes and transmits to an output portion transmitting torque to a drive wheel, a rotating speed of the internal combustion engine, the power transmission mechanism being built so as to switch a gear ratio mode of the power transmission mechanism between a variable gear ratio mode and a fixed gear ratio mode; and
- a computer, the control apparatus comprising:
- a control device that the computer functioning as by implementing a computer program, and the control device being configured to control the power transmission mechanism to switch the gear ratio modes based on a required power to the vehicle and a vehicle speed, a gradient detecting device which detects a gradient of a road where the vehicle travels, a control prohibition device that the computer further functions as by implementing the computer program, and the control prohibition device being configured to determine whether or not a switching of the gear ratio modes performed by the control device is prohibited according to the detected gradient of the road where the vehicle travels in relation to at least any one of the required power and the vehicle speed, and to maintain the gear ratio mode in the variable gear ratio mode or the fixed gear ratio mode when it is determined that the switching of the gear ratio modes is prohibited, and a storage device which stores a map where a control permission region where the switching of the gear ratio modes is permitted, a lock maintaining region where the gear ratio mode is maintained in the fixed gear ratio mode, and a lock prohibition region where the gear ratio mode is maintained in the variable gear ratio mode are set so as not to overlap with each other, in a region which is specified by the required power and the gradient, wherein the control prohibition device is configured to determine whether or not the switching of the gear ratio modes is prohibited based on the map, the lock prohibition region is set so as to include a region where the required power is greater than the required power of the control permission region, and the lock maintaining region is set so as to include a region where the required power is smaller than the required power of the control permission region.

* * * * *

UNITED STATES PATENT AND TRADEMARK OFFICE
CERTIFICATE OF CORRECTION

PATENT NO. : 9,650,035 B2  
APPLICATION NO. : 14/611356  
DATED : May 16, 2017  
INVENTOR(S) : Kenji Itagaki et al.

Page 1 of 1

It is certified that error appears in the above-identified patent and that said Letters Patent is hereby corrected as shown below:

In the Specification

At Column 02, Line 38, change "at least anyone of" to "at least any one of"

At Column 08, Line 22, change "region 31" to "region B1"

At Column 10, Line 65, change "region 31" to "region B1"

In the Claims

At Column 14, Line 25, change "the sear ratio" to "the gear ratio"

At Column 15, Line 17, change "the near ratio" to "the gear ratio"

Signed and Sealed this  
Twenty-fourth Day of July, 2018

Andrei Iancu  
*Director of the United States Patent and Trademark Office*